H. F. MITZEL.
FUSE CAP PROTECTOR.
APPLICATION FILED MAR. 27, 1920.
1,416,856.
Patented May 23, 1922.
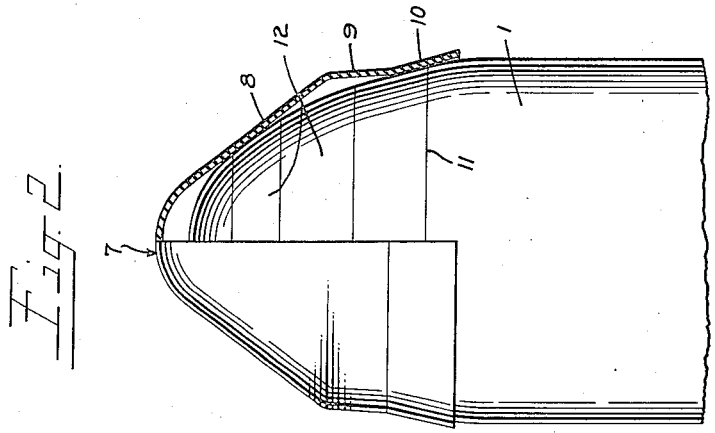
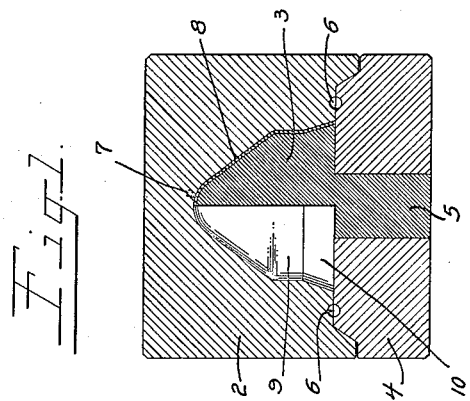
Inventor,
Harvey F. Mitzel,
By his Attorney.

UNITED STATES PATENT OFFICE.

HARVEY F. MITZEL, OF PROVIDENCE, RHODE ISLAND, ASSIGNOR TO THE REVERE RUBBER COMPANY, A CORPORATION OF RHODE ISLAND.

FUSE-CAP PROTECTOR.

1,416,856.      Specification of Letters Patent.      Patented May 23, 1922.

Application filed March 27, 1920. Serial No. 369,265.

*To all whom it may concern:*

Be it known that I, HARVEY F. MITZEL, a citizen of the United States, residing at Providence, county of Providence, and State of Rhode Island, have invented certain new and useful Improvements in Fuse-Cap Protectors, of which the following is a full, clear, and exact description.

This invention relates to covers for shells and like objects into which it is desirable to prevent the entrance of moisture.

Shrapnel, shells and ammunition of varous kinds provided with adjustable fuse caps for ignition regulation of the explosive charge, have heretofore been covered with caps of vulcanized rubber and of metal to protect them from moisture in the atmosphere. The rubber caps are stretched tight over the ogive and in order to grip the shells effectively, are pulled down so far that those on contiguous shells are abraded. These rubber caps being vulcanized, moreover, deteriorate by aging more or less rapidly. Still further they hug the shell fairly close and seem to have a sweating action that is objectionable. Metal covers, on the other hand, are soldered to the shell, and when this is done properly give satisfactory results, but it is difficult to tell when the soldered joint is perfect and furnishes a hermetic seal excluding moisture from entrance under the cover.

The present invention aims to provide a new and improved cover, which is not open to any of the above noted objections, which offers considerable resistance to abrasion, which has good aging qualities, which fits snugly and securely about the end of an object, such as the acuminate end of a shell, which requires no expensive difficult soldering operation of doubtful perfection to mount on a shell, and which has a sufficiently stiff or firm body affording in conjunction with the object a closed or dead-air space that seems to have no sweating action such as attended the use of vulcanized rubber covers.

The invention consists essentially in a cover of a shape suited to embrace the object on which it is to be used and having essentially a marginal flange which is adapted to be forced and sprung on an object so as to grip and hermetically seal off the enclosed portion thereof. The material best suited for making the cover consists of a non-vulcanized composition of balata and rubber with a little finely divided carbon.

These are the objects of my invention, and other objects thereof will appear in the following detailed description of the accompanying drawings in which:

Fig. 1 represents a three-part mold for making a form of cover suitable for protecting shells.

Fig. 2 represents in quarter-section a cover mounted on a shell.

According to the present invention the fuse cap covers or waterproof shields are made from a material of the following composition.

| | |
|---|---|
| Clarified balata | 100 pounds. |
| Fine Pará-rubber | 20 pounds. |
| Carbon gas black | 1 pound. | which, however, is capable of wide variation both in proportion and composition. Balata may be used alone or in various proportions compounded with rubber or with finely divided carbon, but for the best results the material should be of the composition above indicated and contain at least 50% balata.

The material is then molded or otherwise formed to a shape suited to fit the end of an object such as the acuminate end of a shell, indicated in the drawings at 1. For the special purpose of protecting shells, the covers are preferably shaped as illustrated. To this end the right quantity by weight of material is heated to a plastic condition in any suitable manner as by gentle heating on a plate, and introduced into a mold composed of a cavity member 2, a plunger 3, and a centering ring 4 which is suitably fixed to the stem 5 of the plunger. The loaded mold is placed in a cold press for a suitable period of time, two minutes having been found satisfactory for a shaping of fuse cap covers. Any excess material that may be present will escape into the recess or flash cavity 6 at the parting line between the sections. The mold is then taken from the press, opened, and the cover or shield 7 removed. If necessary the flash is trimmed.

The article thus formed for the special purpose of protecting shells has a crown 8, a band portion 9, and a brim portion or flaring flange 10 all of which are formed integral by a wall of substantially uniform thickness disposed symmetrically about an imaginary central axis. The flared or bell-shaped flange 10 affords a substantially water-tight grip or hermetic seal on a shell at or below the lowest parting line 11 of the adjustable ring sections 12 of the fuse cap.

Preferably, but not necessarily, the crown 8 of the cover is so shaped as to rest at an intermediate zone or belt more or less tangentially against the upper end of the shell, for the purpose of bracing the cover or shield against accidental dislodgment and consequential break of the moisture excluding grip of the flange 10 on the projectile.

Made as above described, the cover or shield is of sufficient stiffness to hold its shape and resist deformation in application to a shell or other object. The balata resists aging and deterioration for the usual period of time before the shell is put into service. Balata, moreover, is a material that may be shaped or formed by heat without an incorporated vulcanizing agent, and thus the laborious and expensive vulcanizing operation incident to the manufacture of vulcanized rubber covers is avoided. The cover or shield of the present invention is readily applied and when bound in position on a shell, for instance, with the lower margin stretched or distended slightly, has a firm grip that effectively prevents the entrance of moisture to the powder charge within the shell.

Obviously, the cover or shield may be shaped various ways other than that illustrated in the drawing to perform the function sought, and, of course, the shape may be varied to conform to objects of various outlines or configurations. Though the invention, is, therefore, directed more especially to the protection of fuse caps on shells, it is obviously not limited to such use and may be variously employed for shielding or protecting objects deleteriously affected by moisture or dampness. Reference should, therefore, be made to the accompanying claims for an understanding of the scope of the invention.

Having thus described my invention, what I claim and desire to protect by Letters Patent is:

1. A moisture excluding cover of balatatious composition for the fuse end of shells having a cupped body portion and a marginal gripping portion, the body portion being shaped to embrace the shell end loosely and the marginal gripping portion being flared outwardly and adapted to be distended to grip and seal off the shell and also to support the body portion of the cover.

2. A moisture excluding cover of a composition of balata and rubber for the fuse end of shells having a cupped body portion and an outwardly flared marginal gripping portion, the body portion being of conical form to loosely embrace the shell end and the marginal gripping portion being adapted to be frictionally seated on the shell end to seal the same off and to support the body portion of the cover, said body portion being intermediately shaped to engage the shell end to steady the cover.

3. A moisture excluding cover of a composition of balata, rubber and finely divided carbon for the fuse end of shells having a cupped body portion and a marginal gripping portion, the body portion being shaped to embrace the shell end loosely and the marginal gripping portion being flared outwardly and adapted to be distended to grip and seal off the shell and also to support the body portion of the cover.

4. A moisture excluding cover of a composition of rubber, finely divided carbon and at least 50% balata for the fuse end of shells having a cupped body portion and an outwardly flared marginal gripping portion, the body portion being of conical form to loosely embrace the shell end and the marginal gripping portion being adapted to be frictionally seated on the shell end to seal the same off and to support the body portion of the cover, said body portion being intermediately shaped to engage the shell end to steady the cover.

Signed at Providence, R. I., this 20th day of March, 1920.

HARVEY F. MITZEL.